INVENTOR.
H. F. Rhodes
ATTORNEYS

INVENTOR.
H. F. Rhodes
BY
ATTORNEYS

United States Patent Office 2,830,957
Patented Apr. 15, 1958

2,830,957

EMULSION BREAKING IN CRUDE OIL DESALTING OPERATIONS

Hubert F. Rhodes, Bartlesville, Okla., assignor to Phillips Petroleum Company, a corporation of Delaware Application September 27, 1954, Serial No. 458,364

4 Claims. (Cl. 252—328)

This invention relates to breaking aqueous crude oil emulsions in desalting operation.

In one aspect it relates to breaking of alkaline aqueous crude oil emulsions produced in any manner whatever. In another aspect it relates to a method for breaking aqueous crude oil emulsions by treating only a small proportion of the emulsion to be broken.

Aqueous crude oil emulsions are produced in a number of different ways. Oil wells which have been acidized frequently produce oils containing aqueous solutions of unused acid and/or salts in solution and/or in suspension. Crude oils containing aqueous acid or aqueous solution of salts in suspension should be treated for removal or neutralization of the acid by addition of an alkali in order to eliminate equipment corrosion. Oils containing aqueous solutions of such salts as sodium chloride, calcium chloride and other water soluble and/or water wettable material should be treated for their removal so that they will not be deposited on the walls of heat exchanger tubes or other equipment in which the oil comes in contact during processing. Crude oils containing aqueous or suspended magnesium chloride should be treated for removal of this salt because, in the presence of water, magnesium chloride hydrolyzes to give an acid reaction, especially at distillation temperatures. Removal of the magnesium chloride eliminates corrosion of equipment resulting from its hydrolysis.

One method of removing salt impurities from crude oil involves washing with water prior to the first heat exchange step in the refining operation. When water is added to the crude oil, emulsions are frequently formed which sometimes are difficult to resolve into oil and aqueous phases. Under such conditions special treatment has to be employed in order to break the emulsions so that the aqueous salt solutions can be removed, and further, so that the crude oil will not contain aqueous solution in suspension. Oils containing aqueous solutions or water in suspension frequently cause trouble in stills due to the rapid flashing of the water to steam.

An object of my invention is to provide a method for breaking aqueous crude oil emulsion.

Another object of my invention is to provide a method for breaking aqueous crude oil emulsions by treating only a minor portion of the emulsion.

Still another object of my invention is to provide a method for breaking aqueous crude oil emulsions by treating only a minor and usually the more difficult to break portion of the emulsion.

Yet another object of my invention is to provide a method for the desalting of salt containing crude oils and for the complete breaking of aqueous crude oil emulsions produced in the desalting operation.

I accomplish these and other objects and advantages by continuously washing crude oil containing salt with water, which operation usually produces emulsion, and introducing the aqueous crude oil emulsion into a settling zone, withdrawing water and emulsion-free crude oil from the zone as separate products, continuously withdrawing emulsion from an intermediate level of the zone, admixing an emulsion breaking agent with the continuously withdrawn emulsion and recovering oil and aqueous solution separately from the emulsion containing said emulsion breaking agent.

Figure 1:
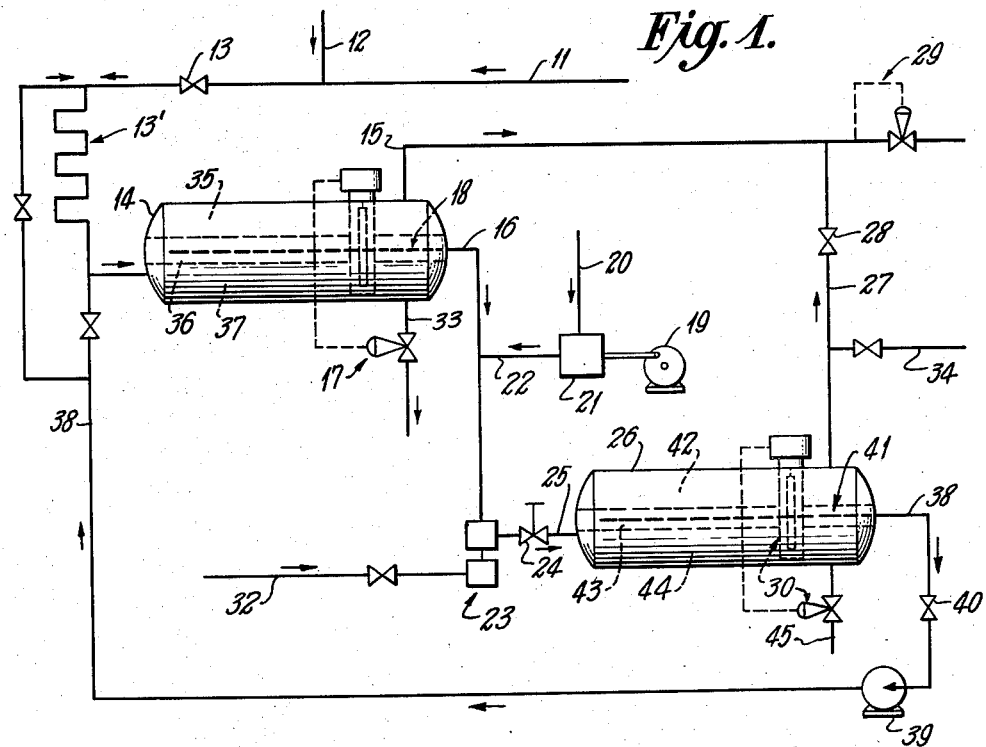
Figure 1 represents diagrammatically one form of apparatus in which to carry out the process of my invention.
Figure 3:
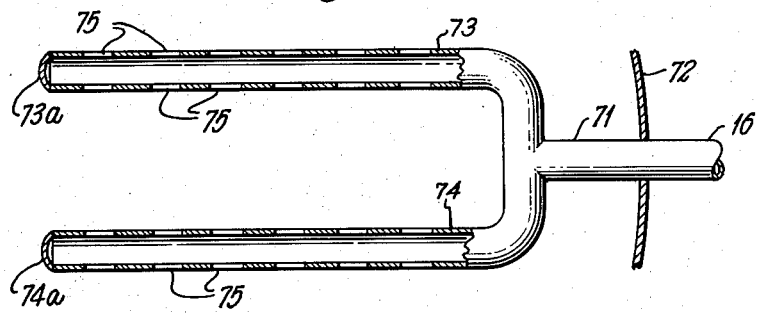
Figure 3 is a plan view illustrating on an enlarged scale a portion of the apparatus of Figures 1 and 2.
Figure 4:
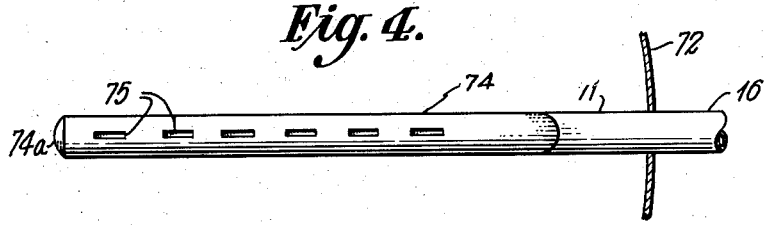
Figure 4 is an elevational view of the apparatus of Figure 3.

Referring now to the drawing and specifically to Figure 1, crude oil containing such foreign matter as aqueous solutions of calcium chloride, and/or magnesium chloride, crystalline or aqueous sodium chloride in suspension, from a source not shown, enters my system through a pipe 11. When crude oil is produced from a well which has been acidized, the oil is usually treated by adding an aqueous caustic alkali, such as soda ash, to prevent acid corrosion of equipment. To such a crude oil in pipe 11, I add water from pipe 12 for washing the oil. This mixture of crude oil and water is passed on through pipe 11 and through a mixing valve 13 which serves to contact intimately the water and crude oil and then the mixture passes through coalescer 13′. This coalescer 13′ can, if desired, be made up of a number of sections of pipes with return bends and orifice plates as mixers. If desired, other means for contacting and coalescing the water and oil can be employed in place of the coalescer which I have illustrated. The mixture of oil and water passes from the coalescer into a settling drum 14. This settling drum is, of course, of a relatively large cross section and sufficient residence time is given the oil and water that at least the major portion of the water settles out as an aqueous phase. Crude oil which is free from suspended water of course rises to the top of the tank while that portion of the emulsion which is difficult to break floats as a separate phase intermediate the aqueous and crude oil phases. The crude oil phase is identified in settler 14 by reference numeral 35, the emulsion phase by reference numeral 36. Emulsion-free crude oil is removed from the top of the tank through a line 15 for such disposal as desired, for example to storage, run storage or directly to processing stills. A back pressure regulator 29 if desired, is provided in line 15, as shown, for maintaining pressure on the treating system. The aqueous phase which settles to the bottom of settler 14 is removed therefrom through a pipe 33. The removal of this aqueous phase is regulated by a float control-valve assembly 17 which operates to remove the aqueous phase in response to the position of a float element disposed within tank 14. The portion of the emulsion which does not resolve itself into crude oil and aqueous phase in tank 14 is removed through emulsion-removing header-tubes 73 and 74 (Figures 3 and 4), which are illustrated in Figure 1 as assembly 18. These header-tubes conduct the emulsion to a common outlet 16 (pipe 71, Figures 3 and 4), from which it passes into line 16 as illustrated in Figure 1. While passing through line 16 an emulsion breaking agent is added from a pipe 22. This emulsion breaking agent is passed from a source, not shown, through a pipe 20 into a chemical feeding apparatus 21 which is powered by a motor 19. This emulsion breaking chemical is forced from feeder 21 through pipe 22 into line 16 as mentioned. In Figure 1 the entire emulsion removing assembly of pipes, which is illustrated in detail in Figures 3 and 4, is identified by reference numeral 18.

The mixture of emulsion and emulsion breaking agent is passed from pipe 16 by a pump 23 through a pipe 25 containing a mixing valve 24 into a settling tank 26. Since the volume of emulsion removed from tank 14 is only a small fraction of the crude oil and emulsion entering tank 14 this settling tank 26 can be relatively small. The crude oil which is freed from the emulsion in tank 26 rises to the top thereof as an oil layer 42, the water settles to the bottom as an aqueous layer 44 while that portion of emulsion which is most difficult to break is disposed between these oil and aqueous layers as an emulsion layer 43. Crude oil from the oil layer 42 is removed therefrom through a pipe 27 and, if desired, can be passed through a pipe 34 and kept separate from the main body of oil flowing through pipe 15. In this case a valve 28 in pipe 27 is closed. However, it is usually desired that the oil from the top of settler 26 be added to the oil flowing through line 15 and in this case the valve in pipe 34 is closed while the valve 28 in pipe 27 is opened. If pump 23 is a steam operated pump, steam for operating the pump comes from a source, not shown, through a pipe 32 and its flow is regulated by a valve therein. However, if desired, this pump can be an electrically operated pump. The pump can, if desired, be a positive displacement pump or a centrifugal pump.

The aqueous solution is removed from the settler 26 through a pipe 45. The removal of this water is controlled by a float controller-motor valve assembly 30. This float controller motor valve assembly 30 and a similar assembly 17 of Figure 1 are operated in such a manner that when the level of the aqueous phase rises above a predetermined level or under such condition when the level of the aqueous phase is very low and the volume of emulsion large the float controllers operate to open the motor valves for removal of the aqueous phase or aqueous phase and emulsion.

In the settling tank 26 under ordinary conditions all or substantially all of the emulsion which enters this tank is broken by the emulsion breaking agent so that the layer of emulsion 43 is very small. The emulsion which does accumulate intermediate the oil and aqueous phases 42 and 44 respectively, is removed from this tank by the emulsion removing apparatus 41 which is similar to the removal apparatus 18. This apparatus 41 is connected with a pipe 38 and the withdrawn emulsion passes through this pipe containing a valve 40 and is transferred by a pump 39 into the primary settler 14. It is usually preferable when cycling this emulsion from settler 26 to add it to the aqueous crude oil feed stream at a point where this feed stream enters the coalescer 13'. However, if desired, this emulsion from pipe 38 can be introduced directly into settler 14 without passing through the coalescer.

Figure 2:
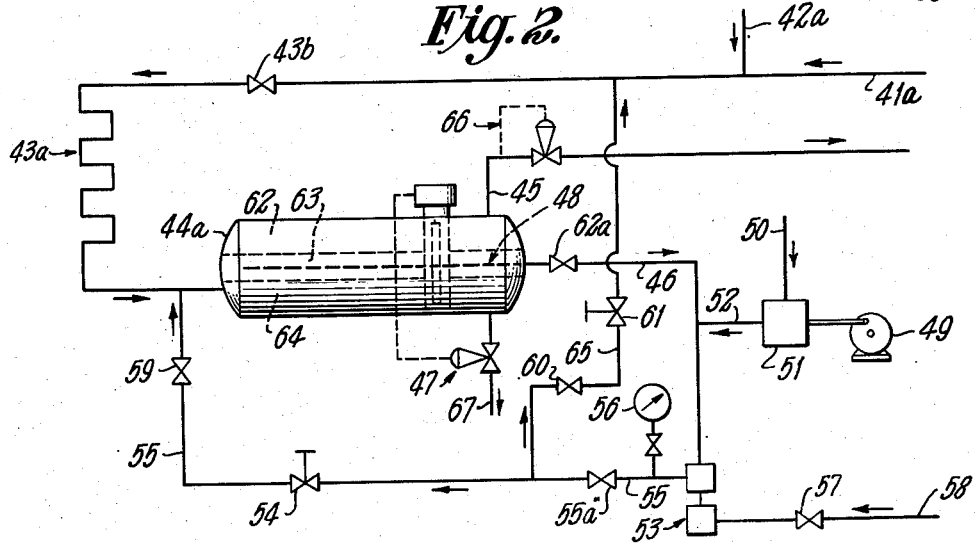
Figure 2 represents in diagrammatic form another embodiment of apparatus in which to practice the process of my invention.

In another embodiment of my invention, as illustrated in Figure 2 crude oil containing material to be removed enters this system through a pipe 41a. Water for washing mineral salts and the like from this oil is introduced through a pipe 42a and the mixture passes through a mixing valve 43b, and a coalescer 43a into a settler vessel 44a. The action taking place in mixing valve 43b and in coalescer 43a is substantially the same as explained above relative to mixing valve 13 and coalescer 13' of Figure 1. The mixture of aqueous solution and oil from coalescer 43a enters the settler 44a and the oil free from emulsion rises to the top of this tank as an oil layer 62 while the water or aqueous solution settles to the bottom as layer 64. Emulsion which is slow or difficult to break disposes its intermediate the oil and water layers as an emulsion layer 63. Emulsion is removed from this tank through an emulsion removal apparatus 48 which is also similar to the apparatus illustrated in Figures 3 and 4. This emulsion is conducted through a line 46 containing a valve 62a and an emulsion breaking chemical agent from a feeder pipe 52 is added thereto. This chemical from a source, not shown, enters the system through a pipe 50 and is fed through pipe 52 by a feeder apparatus 51. This feeder is operated by any desired type of motor 49. The mixture of emulsion and emulsion breaking agent is forced by a pump 53 through a pipe 55 containing a valve 55a and a mixing valve 54. Pipe 55 contains another valve 59 which can be closed in case emulsion and emulsion breaking agent are not to be cycled to the settler 44a directly. Under some conditions valve 59 is closed and a valve 60 in pipe 65 is opened and the mixture of emulsion and emulsion breaking agent is passed through this latter pipe into the feed line 41a so that the mixture will flow through the coalescer 43a along with the feed material. Further mixing of the emulsion and emulsion breaking agent is accomplished by forcing the mixture through a mixing valve 61 disposed in pipe 65. If desired, a pressure gauge 56 can be installed in pipe 55 at a point near the outlet of pump 53 in order to observe the pump outlet pressure. When pump 53 is a steam operated pump steam from a source, not shown, enters the system through a pipe 58 and its flow is regulated by a valve 57.

The crude oil freed from emulsion is removed from the top of tank 44a through a pipe 45 and pressure on this settling tank is maintained if desired, by a back pressure regulator 66 disposed in pipe 45, as shown. Separated water or aqueous solution is removed from this settling tank through a pipe 67 under the influence of float controller-motor valve assembly 47 in a manner similar to that described above relative to Figure 1.

In Figure 3 is illustrated, in diagrammatic form and on an enlarged scale, one form of an emulsion removing apparatus which is found to be very satisfactory for removing emulsion from in between layers of oil and water. Figure 3 illustrates this apparatus in plan view with parts cut away. Figure 4 is a side view of this emulsion removing apparatus. Pipes 73 and 74, closed with caps 73a and 74a, respectively, are disposed in settling tank 14 with their axes horizontal and are attached to an outlet pipe 71 in the general form of a tuning fork. Along the sides of pipes 73 and 74 are disposed a plurality of slots 75. In one case these slots were about ¼ inch wide by 3 inches long on 6 inch centers in 2-inch inside diameter pipes. As can be seen in Figure 3 these slots are disposed on opposite sides of pipes 73 and 74 so as to provide a maximum area of inlet of emulsion from the tanks into the pipes. It should be further noted that all these slots 74 are intended to be at substantially the same level so that if the emulsion phase is a relatively thin phase it still can be removed from the tank. Reference numeral 72 identifies a section of tank wall in which pipe sections 71 and 16 meet.

Figure 5:
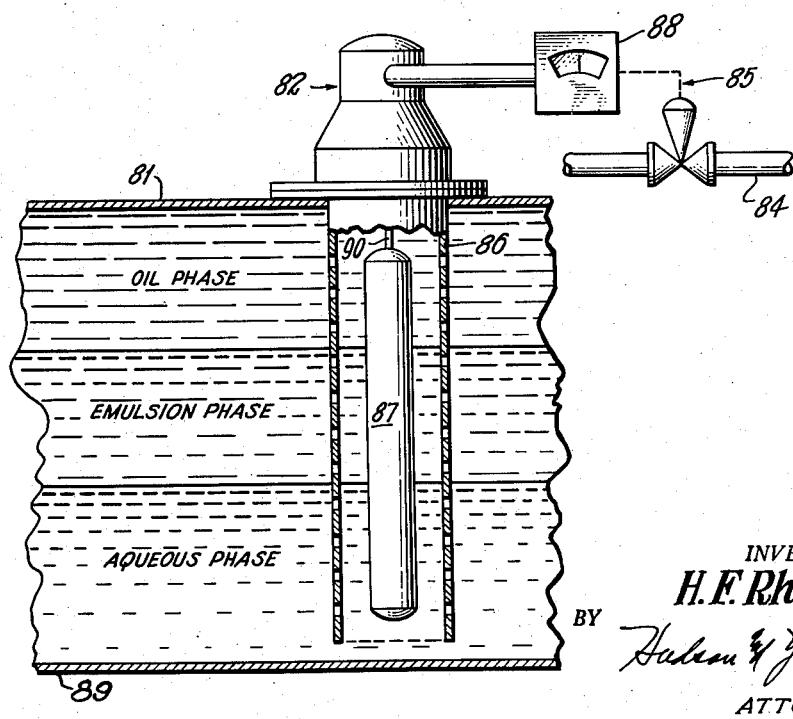
Figure 5 is an elevational view, partly in section, of another portion of the apparatus of Figures 1 and 2.

In Figure 5 is illustrated diagrammatically and on an enlarged scale one form of float controller-motor valve assembly which is used to control the removal of aqueous phase from the settling tanks, as from tank 14 and tank 44a.

In Figure 5 an upper tank wall is identified by reference numeral 81 while the bottom wall of the tank is identified by reference numeral 89. For purposes of clarity emulsion removing tubes, as tubes 73 and 74 (Figures 3 and 4), are not shown in this figure.

Disposed within tank walls 81 and 89 is a perforate cylinder 86. This cylinder is attached to the upper wall of the tank as shown. Within cylinder 86 is disposed a float element 87 which is attached by a support 90 to the head of this controller assembly 82. When the level of the aqueous phase rises the float element 87 tends to rise and this motion is transmitted through element 90 which is connected through an operating mechanism to an indicator or recorder-controller apparatus 88. This latter apparatus operates as a portion of a controller-motor valve assembly 85 the valve of which is disposed in a line 84. Such a float controller apparatus, as illustrated in Figure 5, is an article of commerce and can be purchased from instrument supply houses. This apparatus is intended to operate in such a manner that as the level of the aqueous phase rises the float element 87 and element 90 rise, which movement is indicated and/or recorded in element 88 and the valve in pipe 84 is opened. When this apparatus is installed in tank 44a of Figure 2 and in tanks 14 and 26 of Figure 1 the pipe 84 is intended to be the water or aqueous phase removal line. Thus, when the aqueous phase within the tank rises this float controller apparatus operates to open the water removal valve so that at least a portion of the aqueous phase is removed to restore the level of this phase at some predetermined level.

There are many emulsion breaking agents available in commerce for use in such applications as breaking crude oil emulsions. The paritcular emulsion breaking agent to be used with any given crude oil is not a part of my invention and I will not disclose the composition of any of these reagents since any given crude oil frequently requires a specific emulsion breaking agent and the particular emulsion breaking agent to be used with a given crude oil has to be determined by experiment for each crude oil. Likewise, I will not discuss the percentage or relative amount or amounts of emulsion breaking agents to be used because the amounts required will be dependent upon the emulsion breaking agent employed, the particular crude oil and the particular type of emulsion to be broken and on such other conditions as temperature and pressures maintained in the system. It is obvious also that ordinarily if it is desired for an emulsion to break more rapidly it is merely necessary to use a larger proportion of the emulsion breaking agent.

Under some conditions other float control apparatus can be used in place of the particular type of float control apparatus which I have described. If the emulsions break relatively easily and fairly sharp interfaces can be maintained between the aqueous and the emulsion layer and between the emulsion and oil layer a dual float control assembly such as that described in U. S. Patent 2,600,039 can be used. The motor valves in the aqueous phase withdrawal lines can be on-off valves or they can be throttle valves, the latter being preferred since they give smoother operation than on-off valves.

The valves can be pneumatically operated or electrically operated as desired. Such valves need not be explained in detail because they are available commercially from instrument supply houses.

While certain embodiments of the invention have been described for illustrative purposes, the invention obviously is not limited thereto.

I claim:
1. A method for continuously breaking an aqueous crude oil emulsion comprising continuously introducing crude oil containing said emulsion into a settling zone, continuously withdrawing emulsion from an intermediate level of said zone, adding an emulsion breaking agent to the withdrawn emulsion, adding the mixture of withdrawn emulsion and emulsion breaking agent to the original crude oil containing said emulsion before introducing into said zone, and removing emulsion-free crude oil and an aqueous phase from said settling zone as separate products of the process.

2. A method for continuously breaking an aqueous crude oil emulsion comprising continuously introducing crude oil containing said emulsion into a settling zone, withdrawing water and emulsion-free crude oil from said zone as separate products, continuously withdrawing only emulsion from an intermediate level of said zone, admixing an emulsion breaking agent with the continuously withdrawn emulsion, and adding the admixture of emulsion and emulsion breaking agent to said settling zone.

3. A method for continuously breaking an aqueous crude oil emulsion comprising continuously introducing crude oil containing said emulsion into a settling zone, maintaining a body of an aqueous phase in the lower portion, a body of an oil phase in the upper portion and an emulsion phase intermediate the aqueous and oil phases in said zone, withdrawing oil from the oil phase as one product, withdrawing aqueous phase from said zone in response to the buoyancy of a vertically elongated float element maintained suspended in the three phases of said zone, withdrawing emulsion from said zone, admixing an emulsion breaking agent with the withdrawn emulsion, and introducing the emulsion containing emulsion breaking agent into said zone.

4. An emulsion breaking system comprising, in combination, an emulsion settling vessel, a first conduit for introducing oil and emulsion into said vessel, a coalescer in said first conduit, a first outlet for outlet of emulsion-free oil from said vessel, a second outlet for outlet of settlings from said vessel, a second conduit communicating with said vessel at a level intermediate said first and second outlets for withdrawal of emulsion, a third conduit communicating said second conduit with said first conduit for transfer of withdrawn emulsion to said first conduit, a pump in said third conduit for effecting said transfer, means for introducing an emulsion breaking agent into said third conduit, a motor valve in operative communication with said second outlet, a liquid-level float controller assembly in operative communication with said settling vessel and with said motor valve for regulation of the rate of removal of said settlings through said second outlet, the float of said assembly being vertically elongated, disposed in said vessel, and adapted to be suspended simultaneously in oil, emulsion and settlings therein.

References Cited in the file of this patent

UNITED STATES PATENTS

| 1,660,235 | Pierce | Feb. 21, 1928 |
| 2,338,986 | Waterman | Jan. 11, 1944 |
| 2,600,039 | Whaley | June 10, 1952 |